United States Patent [19]
Springfield

[11] 3,864,975
[45] Feb. 11, 1975

[54] TEMPERATURE MEASURING APPARATUS

[76] Inventor: Redwood L. Springfield, 572 Trianon, Houston, Tex. 77019

[22] Filed: Apr. 16, 1973

[21] Appl. No.: 351,478

[52] U.S. Cl.................... 73/341, 73/343 R, 73/353
[51] Int. Cl. ............................................. G01k 1/14
[58] Field of Search.......... 73/341, 342, 353, 343 R, 73/340

[56] References Cited
UNITED STATES PATENTS
2,665,322  1/1954  MacDonald ........................... 73/341
3,015,954  1/1962  Dalglish ............................... 73/341
3,111,846  11/1963  Willer .................................. 73/353

Primary Examiner—Jerry W. Myracle
Assistant Examiner—Denis E. Corr

[57] ABSTRACT

Temperature measuring device, utilizing coiled thermocouple cables, which coils expand or contract as a function of the fluid level within a fluid-containing tank.

5 Claims, 4 Drawing Figures

TEMPERATURE MEASURING APPARATUS

BACKGROUND OF THE INVENTION

For some time, fluids, such as petroleum or chemical products, have been stored, many times outdoors, in large tanks. More recently, many of such storage vessels have been equipped with floating roofs, which rise and fall with the fluid level. Such floating roofs tend to reduce evaporation of the fluids. The fluid is normally pumped from the tanks, and sold for a specific value, based on volume, such as per barrel or gallon. Determining such quantity involves several variables, one of the important ones being temperature of the fluid. This temperature may vary at different levels. Thus it is beneficial to determine average temperatures within the vessels, and thereby of the dispatched fluids. The prior art has taught the use of a plurality of discreet measuring points, using thermocouples or the like, but has not been able to satisfactorily and economically provide a temperature averaging system where the separation ratio between adjacent thermocouples remains constant, regardless of the amount of fluid stored, or where a float utilized therewith is adequately protected from turbulence. A prior art search produced the following references, U.S. Pat. Nos. 3,015,954; 2,924,974; 2,721,480; 2,677,276; 3,360,990; 3,180,148; and 2,279,043.

SUMMARY OF THE INVENTION

Thermocouple means are provided which extend from the tank through the top and outwardly to measuring instruments. Such means include a plurality of individual cables, spirally wound around each other, to form a flexible, somewhat resilient, coil length. A float member may be provided which may ride on the surface of the fluid, and through which would pass the thermocouple means, and affixed thereto. Guides for such float, to prevent swirling, may be fixed struts, in the case of a fixed roof, or constant force springs, in the case of a floating roof. In instances using such a float, the thermocouple means would be anchored to the tank bottom, to the float, and to the roof. As the fluid level rises or falls, the relative separation between thermocouple measuring points would remain constant, due to the spring like tendencies of the spirally wrapped coil. Externally, known apparatus may then average the readings of the plurality of discreet measuring points. Because of the constant ratio of the spacing between the measuring points, no blind spots are encountered, and accurate average temperature profiles are produced.

DESCRIPTION OF THE INVENTION

Figure 1:
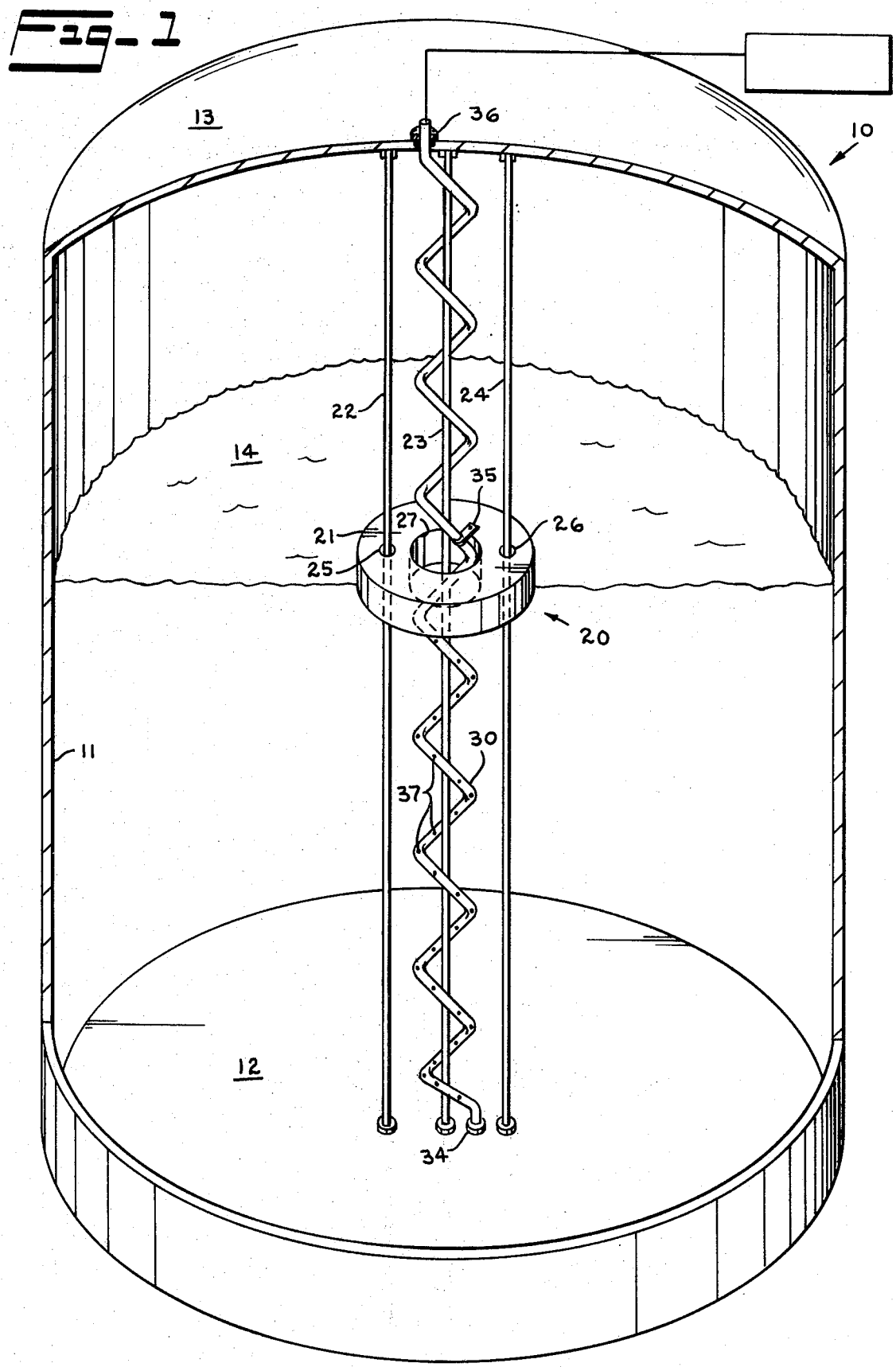
FIG. 1 is a partly schematic, vertical section through a fixed roof storage tank, with the thermocouple assembly in place.
Figure 2:
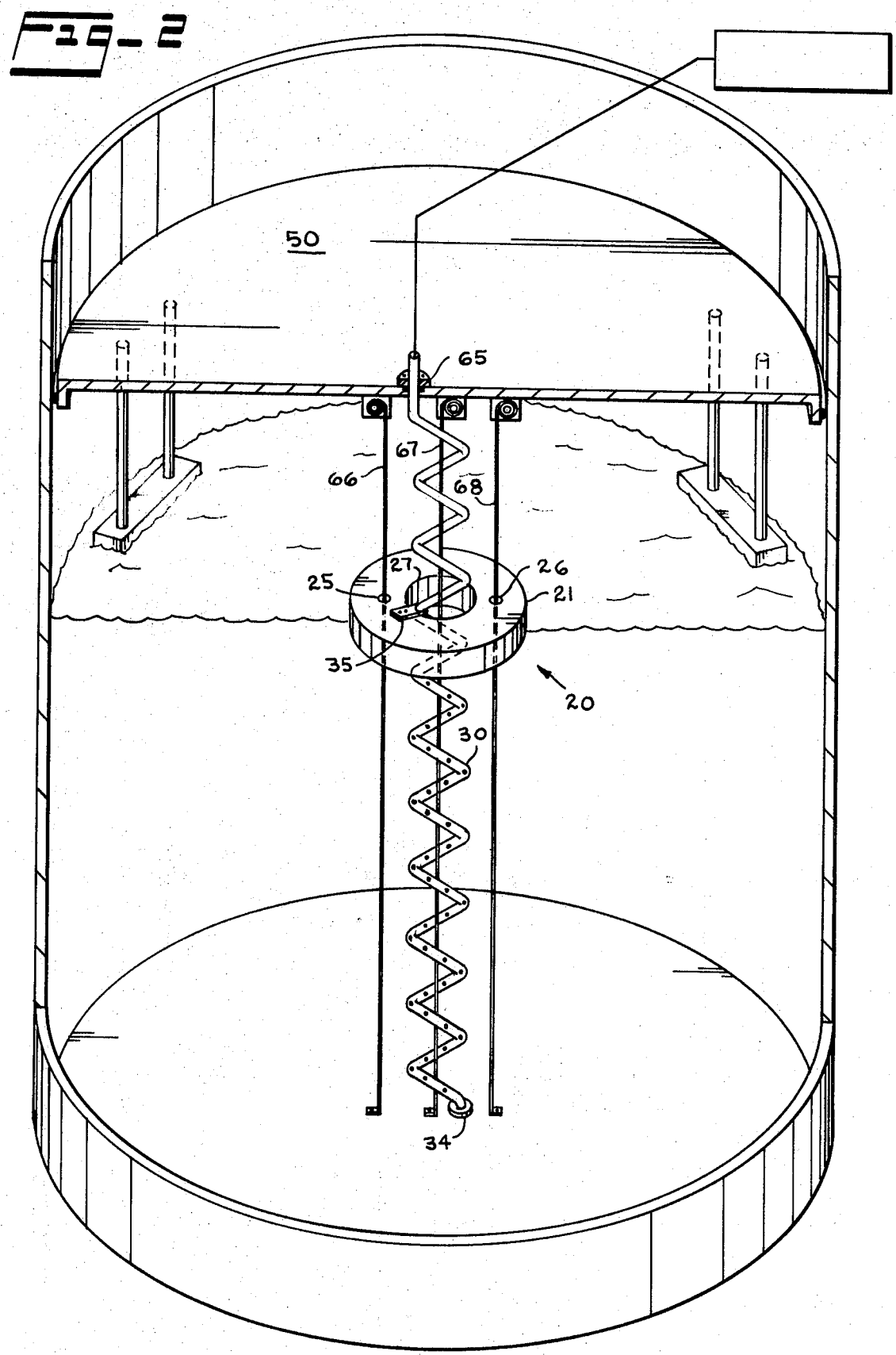
FIG. 2 is similar to FIG. 1, with the roof being of the floating variety.

FIGS. 1 and 2 indicate that basic features of this invention may be utilized in either fixed or floating roof storage tanks. Looking first at FIG. 1, the fixed roof tank is illustrated generally at 10. It may have upright wall 11, of various configurations, bottom 12 and top or cover 13. The top normally is fixed or closed, with provisions for ingress and egress. A fluid is shown therein, having a level 14. This level would rise or fall, as a function of the supply to and withdrawel from the tank.

The apparatus comprising this invention is illustrated by the general numeral 20. Riding generally on the fluid surface is a flotation device 21. Because of the possibility of turbulence of the fluid, and swirling effects, means are provided to stabilize the float, i.e., to generally restrict its motion to rising and falling with the fluid level. Such means is exemplified by vertical supports 22, 23 and 24, which would be anchored to the top and bottom of tank 10. These supports would pass through peripheral apertures 25 and 26 of float 21, as well as through a larger central opening therethrough, designated 27. This central support 23 may also serve, if desired, as a guide for the thermocouple coil later described. Although the use of thermocouple junctions is preferred, it is possible that similarly performing, temperature measuring devices, such as temperature resistance elements, may be used.

Figure 3:
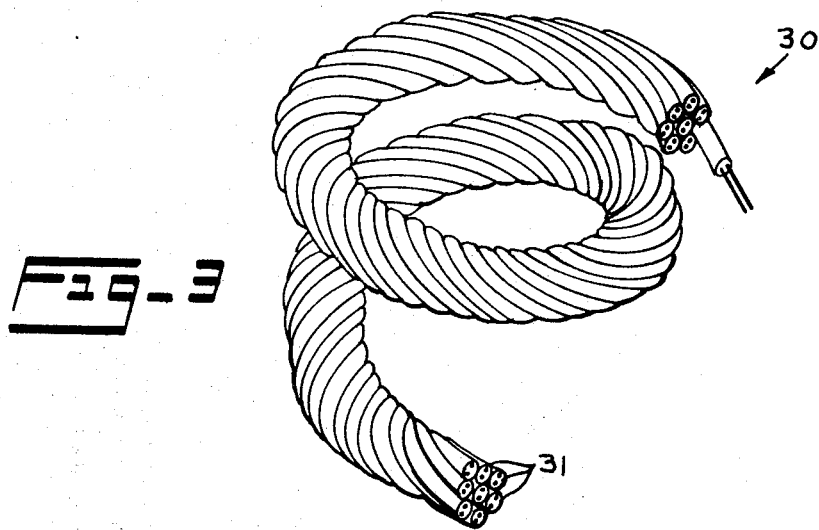
FIG. 3 is a horizontal section through a thermocouple coil.

The thermocouple coil used herein, illustrated at 30, actually would include a bundle, or plurality of individual thermocouple-junction-containing cables, 31, which may be metal sheathed. The presence of an illustrative number of such cables, is depicted in the sectional view of FIG. 3. Obviously, this view is not to scale, in that the individual cable may be fabricated as small as ten, one thousands of an inch O.D. The point to be made is that one coil may contain a large number of thermocouple cables, with a resultant large number of measuring points.

An individual cable may have an outer jacket 32, with individual thermocouple wires or leads 33 therein, and insulating filler surrounding such leads. The mass of individual cables are spirally wrapped around each other to form the coil 30. The coil, which may then have the general appearance of a coaxial cable, in section, possesses spring characteristics, in that it will, relatively uniformly, contract or expand axially, or vertically as in FIG. 1. As mentioned previously, the helically wrapped coil, may in turn loosely encircle central support 23, as insurance against binding, and for guide purposes. Moving upwardly from the bottom of the tank in FIG. 1, the coil is fixed to said tank bottom at 34. Proceeding upwardly, said coil is further affixed to an anchoring point 35, within the central aperture of float 21. Still continuing, said coil is also linked to the tank top at 36. The coil may then exit, through a suitable opening through said top, there being packing or sealing means around such opening, to finally be connected to suitable instrumentation. Such instrumentation, already known and therefore not described, would be capable of registering, summing, and averaging the emf generated by the respective thermocouple junctions, thereby providing the desired information concerning average temperature within the fluid.

Figure 4:
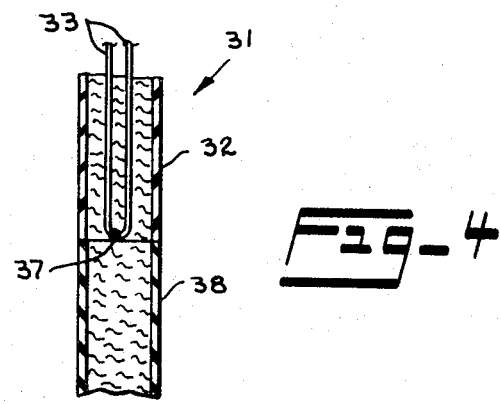
FIG. 4 is a sectional detail of a portion of an individual thermocouple cable.

The plurality of dots in FIG. 1 are illustrative of measuring points, i.e., thermocouple junctions. FIG. 4 depicts a sample junction. Leads 33, of diverse materials, culminate in the actual junction 37. It is seen that a dummy cable extension 38 continues below, being clamped or otherwise affixed to the actual cable, in the area of the junction, without blocking the junction's contact with the ambient fluid. The purpose of this dummy extension is to insure that the entire length of the coil 30 presents approximately the same spring-like characteristics.

Consider now the "floating roof" embodiment, as shown particularly in FIG. 2. The floating roof itself bears the numeral 50. This type of roof, as such, is well known in the art. In some tanks utilizing this type of roof, vertical guide rails are provided for the inner tank wall, within which guides slide mating roof parts. Sometimes pontoon-like structures are affixed to the roof underside, and ride on the fluid surface. In other instances, gas or light-weight beads are provided above the stored liquid, often to prevent excessive fluid evaporation, and the roof floats above such materials. Such a roof moves with the fluid level. In any case, the roof itself, other than as necessarily modified herein, and the means for supporting the same, are not critical to this invention.

The float 21, like FIG. 1, is shown positioned at the fluid surface. It is possible, that under some circumstances, the float may be eliminated, though it is preferred.

The thermocouple coil, and the cables contained therein, would be constructed like member 30 of FIG. 1. It would be anchored to the bottom of the tank at 34. Moving upwardly past the individual junctions, it would further be anchored at 35 within the central float aperture, and also at 65 to the wall of an aperture through floating roof 50. Thereafter, it would exit the tank, possibly after being anchored at the top of the tank wall, to instrumentation of the type described previously.

In place of the fixed vertical supports of FIG. 1, constant force springs are utilized, they being identified by numerals 66, 67 and 68. These springs, as exemplified by those sold under the trademark NEGATOR, by Ametek, Inc., exert a constant force, regardless of the extension of the spring, within the dimensional limits thereof. They are available in reel form. Here, the reel, for example, may be affixed to either the floating roof or to the tank bottom, with the unreeled end of the spring fixed to the other. Not only would such constant force spring serve to prevent swirling of the float (if one is used) and to guide the thermocouple coil, if it is desired to wrap the coil around the central spring 67, but also would exert constant forces urging the floating roof toward the fluid surface, regardless of the level of the fluid and regardless of the length of the extension or contraction of the spring from its reel. Here, as in Flg. 1, as the float (or the roof, if the float is eliminated) moves upwardly or downwardly, the coil below the float will coil or unwind, due to its spring-like characteristics, keeping the discreet measuring points separated by the same ratio. The dummy cable extensions would be present, like FIG. 1.

Although limited embodiments have been described, it should be obvious that numerous modifications would be possible, by one skilled in the art, without departing from the spirit of the invention, the scope of which is intended to be limited only by the following claims.

I claim:

1. Apparatus for measuring temperature within a variable-level-fluid-containing vessel, said apparatus comprising:

A coil containing means for measuring the temperature of said fluid at a plurality of discreet points, said coil being adapted to be anchored, at one end, to said vessel;

flotation means adapted to move vertically in response to said fluid level, said flotation means being adapted to have said coil anchored thereto, at a point removed from said one end; and vertical support means affixed to the bottom of said vessel and to said flotation means, said vertical support means comprising at least one extensible constant force spring.

2. Apparatus of claim 1, and wherein said constant force spring includes a reel portion, and one end of said constant force spring is adapted to be affixed to a floating roof.

3. Temperature measuring apparatus including in combination:

fluid containing vessel having bottom, upright walls, and a floating roof which rises and falls as a function of the level of the fluid in said vessel.

coil, fixed to said bottom and to said floating roof, and adapted to extend outwardly therefrom;

said coil comprising a plurality of thermocouple-cables containing junctions, spirally wrapped around each other; and constant force extensible spring means fixed to said bottom and to said roof.

4. Apparatus of claim 3, and including flotation means riding on fluid surface in said vessel, said coil being further affixed to said flotation means.

5. Apparatus of claim 4, said flotation means circumscribing portions of said constant force spring means.

* * * * *